(12) United States Patent
Imoto et al.

(10) Patent No.: US 11,667,264 B2
(45) Date of Patent: Jun. 6, 2023

(54) UNAUTHORIZED INTRUSION PREVENTION DEVICE, UNAUTHORIZED INTRUSION PREVENTION METHOD, AND UNAUTHORIZED INTRUSION PREVENTION PROGRAM

(71) Applicant: DENSO CORPORATION, Kariya (JP)

(72) Inventors: Reiichirou Imoto, Kariya (JP); Takeshi Sugashima, Kariya (JP); Masumi Egawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/371,146

(22) Filed: Jul. 9, 2021

(65) Prior Publication Data

US 2022/0017041 A1    Jan. 20, 2022

(30) Foreign Application Priority Data

Jul. 14, 2020 (JP) .............................. JP2020-120685

(51) Int. Cl.
*B60R 25/20* (2013.01)
*B60R 25/30* (2013.01)
*G08B 13/22* (2006.01)

(52) U.S. Cl.
CPC .......... *B60R 25/2009* (2013.01); *B60R 25/30* (2013.01); *G08B 13/22* (2013.01)

(58) Field of Classification Search
CPC ...... B60R 25/2009; B60R 25/30; G08B 13/22
See application file for complete search history.

(56) References Cited

U.S. PATENT DOCUMENTS 9,380,070 B1 *   6/2016  Cain ....................... H04L 67/12
11,190,533 B2 *  11/2021 Tsurumi ............. B60R 16/0232
(Continued)

FOREIGN PATENT DOCUMENTS

| JP | 2017055530 A | * | 3/2017 |
| JP | 2019-125344 A | | 7/2019 |
| JP | 2019-133599 A | | 8/2019 |

OTHER PUBLICATIONS

U.S. Appl. No. 17/346,314, filed Jun. 14, 2021, Nagara et al.
(Continued)

*Primary Examiner* — Nay Tun
(74) *Attorney, Agent, or Firm* — Harness, Dickey & Pierce, P.L.C.

(57) ABSTRACT

An unauthorized intrusion prevention device is provided that, in response to detection of abnormality in an electronic control device mounted in a movable body, gives an instruction for executing measures for the movable body. The unauthorized intrusion prevention device acquires first information related to a protection function of the electronic control device and second information related to a function of the electronic control device other than the protection function. The unauthorized intrusion prevention device, using the first information, performs a first determination of whether the protection function is normal. The unauthorized intrusion prevention device, using the second information, performs a second determination of whether the function other than the protection function is normal or abnormal. The unauthorized intrusion prevention device, using results of first and second determination, determines as the measures a blocking method of blocking unauthorized information in the movable object.

7 Claims, 8 Drawing Sheets

(56) References Cited

U.S. PATENT DOCUMENTS

| | | | |
|---|---|---|---|
| 2013/0290771 A1* | 10/2013 | Kim | G06F 11/1415 |
| | | | 714/3 |
| 2015/0138949 A1* | 5/2015 | Kurogi | H04L 41/0668 |
| | | | 370/221 |
| 2017/0013005 A1* | 1/2017 | Galula | H04L 63/1425 |
| 2017/0118230 A1* | 4/2017 | Wakita | H04L 63/1416 |
| 2018/0144128 A1* | 5/2018 | Hakuta | G06F 21/554 |
| 2018/0152472 A1* | 5/2018 | Amano | H04W 12/122 |
| 2018/0218158 A1* | 8/2018 | Amano | H04L 12/40006 |
| 2018/0295147 A1* | 10/2018 | Haga | H04L 63/1441 |
| 2018/0351980 A1* | 12/2018 | Galula | H04W 4/44 |
| 2018/0375879 A1* | 12/2018 | Carlesimo | H04W 12/12 |
| 2019/0050337 A1* | 2/2019 | Kaga | G06F 11/2089 |
| 2019/0173912 A1* | 6/2019 | Ujiie | H04L 63/1466 |
| 2019/0312892 A1* | 10/2019 | Chung | G06F 21/554 |
| 2020/0106743 A1* | 4/2020 | Park | H04L 63/308 |
| 2020/0274729 A1* | 8/2020 | Takada | H04L 9/3242 |
| 2020/0342099 A1* | 10/2020 | Kerstein | G07C 5/008 |
| 2021/0044612 A1* | 2/2021 | Kawauchi | H04W 12/122 |
| 2021/0049275 A1* | 2/2021 | Higashiyama | G06F 21/577 |
| 2021/0058372 A1* | 2/2021 | Katoh | B60W 40/105 |
| 2021/0112085 A1* | 4/2021 | Sasaki | H04L 43/04 |
| 2021/0194921 A1* | 6/2021 | Guajardo Merchan | G06F 8/65 |
| 2021/0203682 A1* | 7/2021 | Bajpai | H04L 63/1408 |
| 2021/0237665 A1* | 8/2021 | Tamura | G07C 5/085 |

OTHER PUBLICATIONS

U.S. Appl. No. 17/368,999, filed Jul. 7, 2021, Nagara et al.
U.S. Appl. No. 17/371,163, filed Jul. 9, 2021, Ishida et al.
U.S. Appl. No. 17/371,148, filed Jul. 9, 2021, Nagara et al.

* cited by examiner

UNAUTHORIZED INTRUSION PREVENTION DEVICE, UNAUTHORIZED INTRUSION PREVENTION METHOD, AND UNAUTHORIZED INTRUSION PREVENTION PROGRAM

CROSS-REFERENCE TO RELATED APPLICATIONS

This application is based on Japanese Patent Application No. 2020-120685 filed on Jul. 14, 2020, disclosure of which is incorporated herein by reference.

FIELD

The present disclosure relates to an unauthorized intrusion prevention device, an unauthorized intrusion prevention method and an unauthorized intrusion prevention program.

BACKGROUND

Cyber security is an issue in various fields including a field of vehicle, for example, automobile.

SUMMARY

The prevent disclosure provides an unauthorized intrusion prevention device, an unauthorized intrusion prevention method and an unauthorized intrusion prevention program.

In a first example, there is provided an unauthorized intrusion prevention device that, in response to detection of abnormality in an electronic control device mounted in a movable body, gives an instruction for executing measures for the movable body. The unauthorized intrusion prevention device acquires first information related to a protection function of the electronic control device and second information related to a function of the electronic control device other than the protection function. The unauthorized intrusion prevention device, using the first information, performs a first determination of whether the protection function is normal or abnormal. The unauthorized intrusion prevention device, using the second information, performs a second determination of whether the function other than the protection function is normal or abnormal. The unauthorized intrusion prevention device, using a result of the first determination and a result of the second determination, determines as the measures a blocking method of blocking unauthorized information in the movable object.

In a second example, there is provided an unauthorized intrusion prevention method of, in response to detection of abnormality in an electronic control device mounted in a movable body, giving an instruction for executing measures for the movable body. The unauthorized intrusion prevention method comprises: acquiring first information related to a protection function of the electronic control device and second information related to a function of the electronic control device other than the protection function; performing a first determination of whether the protection function is normal or abnormal, by using the first information; performing a second determination of whether the function other than the protection function is normal or abnormal, by using the second information; and, by using a result of the first determination and a result of the second determination, determining, as the measures, a blocking method of blocking unauthorized information in the movable object.

In a third example, there is provided an unauthorized intrusion prevention program executable by an unauthorized intrusion prevention device that, in response to detection of an abnormality in an electronic control device mounted in a movable object, gives an instruction for executing measures for the movable object. The unauthorized intrusion prevention program, when executed by the unauthorized intrusion prevention device, causes the unauthorized intrusion prevention device to perform: acquiring first information related to a protection function of the electronic control device and second information related to a function of the electronic control device other than the protection function; performing a first determination of whether the protection function is normal or abnormal, by using the first information; performing a second determination of whether the function other than the protection function is normal or abnormal, by using the second information; and by using a result of the first determination and a result of the second determination, determining as the measures a blocking method of blocking unauthorized information in the movable object.

BRIEF DESCRIPTION OF DRAWINGS

Objects, features and advantages of the present disclosure will become more apparent from the below detailed description made with reference to the accompanying drawings. In the drawings.

DETAILED DESCRIPTION

In recent years, technologies for providing driver-assistance and autonomous driving control, including V2X communication such as vehicle-to-vehicle (V2V) communication and vehicle-to-infrastructure (V2I) communication, have attracted attention. Along with this, a vehicle has a communication function, and so-called connectivity of the vehicle has been promoted. As a result, a possibility of a cyber attack on a vehicle is increasing. Since control of a vehicle may be lost due to a cyber attack, stronger defense against the cyber attack is required.

Regarding a cyber attack on a vehicle, there is a device that detects an incident based on a vehicle log, specifies a device having a vulnerability in a network, and performs provisional measures for the specified device.

Also, there is a device including a controller that changes at least one of a method of communication with the outside of a vehicle, a protection method against an unauthorized attack, or a storage method for a log related to vehicle-mounted device in accordance with depth of intrusion of an unauthorized attack on the vehicle.

The present inventors have found the following.

As measures against security incidents, it is required to promptly take measures such as provisional measures to prevent the spread of damage. In a case of vehicles employing a multi-layer defense architecture, conceivable measures may include blocking harmful information and unauthorized information including harmful communication. In this case, it may be preferable to block intrusion at an upper layer (for example, top layer) that is an intrusion entrance, but when the intrusion already reaches a lower layer (for example, the second top layer), the damage may become widespread.

An object of the present disclosure is to provide a technology that can effectively block unauthorized information.

In an example, there is provided an unauthorized intrusion prevention device that, in response to detection of abnormality in an electronic control device mounted in a movable body, gives an instruction for executing measures for the movable body. The unauthorized intrusion prevention device comprises: an acquirer unit that acquires first information related to a protection function of the electronic control device and second information related to a function of the electronic control device other than the protection function; a first determiner unit that, using the first information, performs a determination of whether the protection function is normal or abnormal; a second determiner unit that, using the second information, performs a determination of whether the function other than the protection function is normal or abnormal; and a measures determiner unit that, using a result of the determination by the first determiner unit and a result of the determination by the second determiner unit, determines, as the measures, a blocking method of blocking unauthorized information in the movable object.

With the above-described configurations, unauthorized information can be effectively blocked under the minimum necessary restrictions.

Hereinafter, embodiments will be described with reference to the drawings.

In the description of the embodiments, effects in a case of having a configuration of an embodiment may be described.

With regard to two or more embodiments, a configuration disclosed in a respective embodiment is not limited to the respective embodiment. Embodiments are combinable. For example, a configuration disclosed in one embodiment may be combined with another embodiment. Configurations disclosed two or more embodiments may be collected and combined.

1. Configuration Common to Embodiments (1) Overall Configuration of Unauthorized Intrusion Prevention System First, referring to FIG. 1, the overall configuration of an unauthorized intrusion prevention system common to embodiments will be described.

Figure 1:
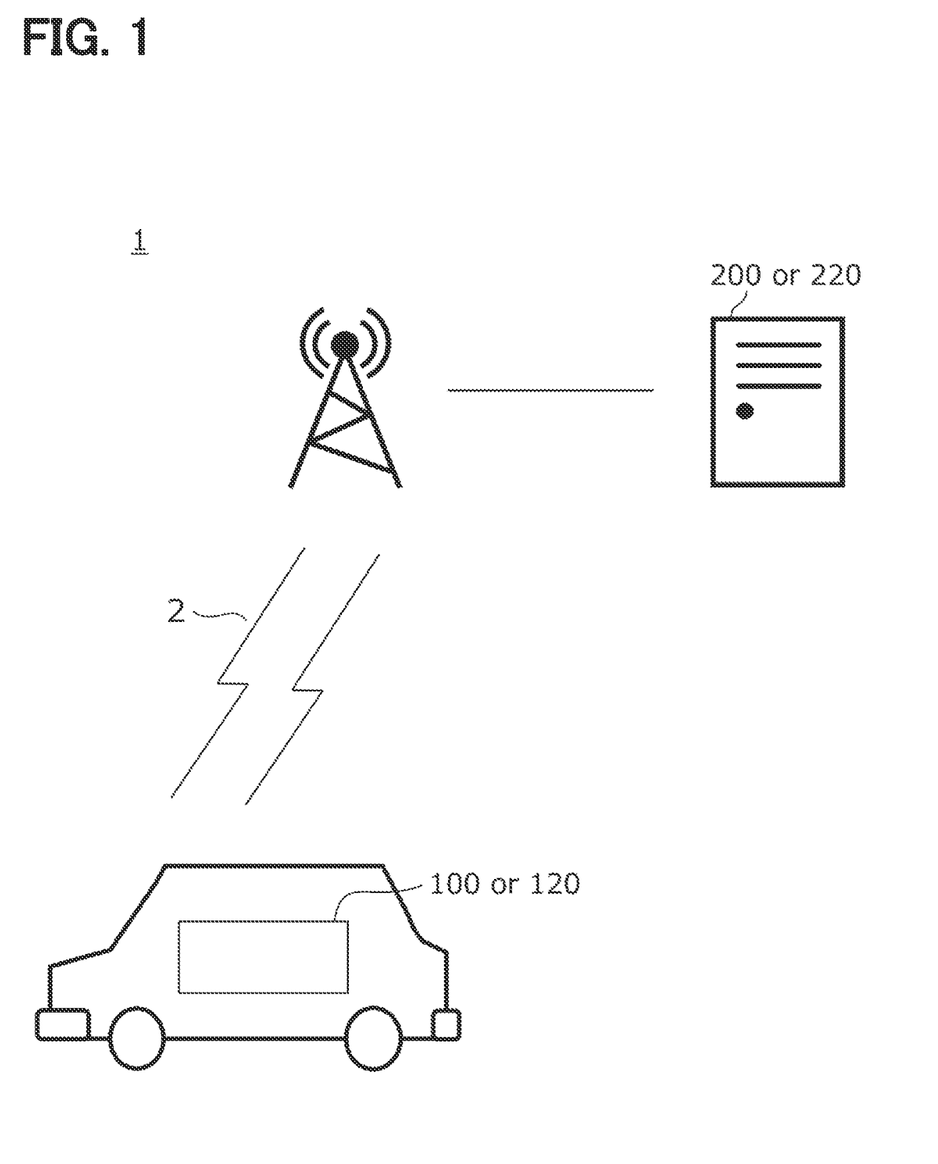
FIG. 1 is a diagram illustrating a configuration example of an unauthorized intrusion prevention system according to an embodiment of the present disclosure.

An unauthorized intrusion prevention system 1 includes a vehicle-mounted device 100 (or 120) mounted in a vehicle, and a center device 200 (or 220). In the section "1. Configuration common to embodiments", the vehicle-mounted device 100 (or 120) may be referred to as the vehicle-mounted device 100 and the center device 200 (or 220) may be referred to as the center device 200.

The vehicle-mounted device 100 is connected to the center device 200 via a communication network 2.

Examples of the communication network 2 using a wireless communication system include IEEE 802.11 (WiFi (registered trademark)), IEEE 802.16 (WiMAX (registered trademark)), (Wideband Code Division Two or more Access (W-CDMA), High Speed Packet Access (HSPA), Long Term Evolution (LTE), Long Term Evolution Advanced (LTE-A), 4G, 5G, etc. Also, Dedicated Short Range Communication (DSRC) may be used.

Examples of the communication network 2 using a wired communication system include a local area network (LAN), the Internet, and a fixed telephone line.

The communication network may include a combination of the wireless communication system and the wired communication system. For example, the vehicle-mounted device 100 and a base station device in a cellular system may be connected to each other via the wireless communication system, and the base station device and the center device 200 may be connected to each other via the wired communication system such as a core line of a communication carrier or the Internet.

The "unauthorized intrusion prevention device" in some embodiments is mounted in either the vehicle-mounted device 100 or the center device 200. In Embodiment 1, the unauthorized intrusion prevention device is mounted in the center device 200. In Embodiment 2, the unauthorized intrusion prevention device is mounted in the vehicle-mounted device 100.

The "unauthorized intrusion prevention device" may be any device as long as the device gives an instruction for execution of measures to prevent unauthorized intrusion, and may not necessarily include a function of executing the measures to prevent unauthorized intrusion in a subject device.

(2) Provisional Measures

Provisional measures common to some embodiments will be described with reference to FIGS. 2A and 2B.

It is assumed that two or more ECUs are connected to the vehicle-mounted device 100 and the two or more ECUs belong to layers. In FIGS. 2A and 2B, an ECU 1 is located in an upper layer, and an ECU 2 is located in a "lower layer" than the ECU 1. Such layers are found, for example, in an in-vehicle network system in which: a communication ECU performs communication with the outside; and a central gateway ECU (CECU) connected to the communication ECU and two or more individual ECUs manages the individual ECUs. Specifically, the lower the layer in the ECUs in the order of the communication ECU, the CECU, and the individual ECUs. A sub-gateway ECU or the like may be further used to subdivide into a domain or a sub-network to provide a further layer.

The "lower layer" may be physically or functionally lower. Examples of the "physically" include a distance from a communication ECU having a contact point with the outside, or the number of devices such as ECUs on a path from the communication ECU, and examples of the "functionally" include slave among ECUs having a master-slave relationship.

Figure 2A:
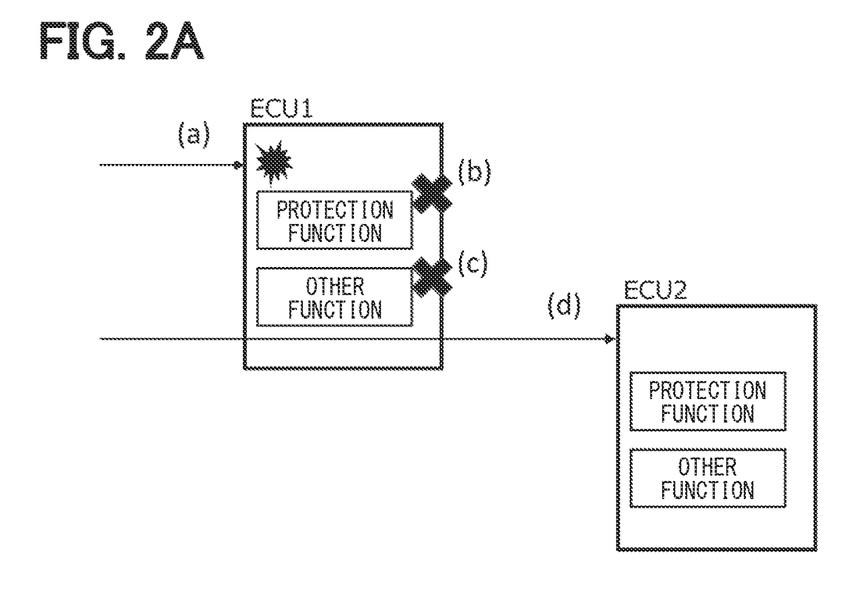
FIG. 2A and FIG. 2B are explanatory diagrams for describing provisional measures common to embodiments of the present disclosure.

As illustrated in FIG. 2A, the examples of the attack on ECUs belonging to the layers are as follows. (a) First, unauthorized information is transmitted as correct information from the outside, and is received by the ECU 1. At this point, a protection function of the ECU 1 and the function other than the protection function of the ECU 1 are still operating normally. (b) Next, the protection function of the ECU 1 is disabled by the unauthorized information. At this point, the protection function of the ECU 1 is disabled and unable to perform normally, but the other function is still operating normally. (c) The other function of the ECU 1 is disabled by the unauthorized information, and thus all of the functions of the ECU 1 are disabled. At this point, both the protection function and the other function of the ECU 1 are disabled and thus unable to perform normally. (d) The unauthorized information is transmitted as correct information from the outside, and is received by the ECU 2 through the ECU 1.

Figure 2B:
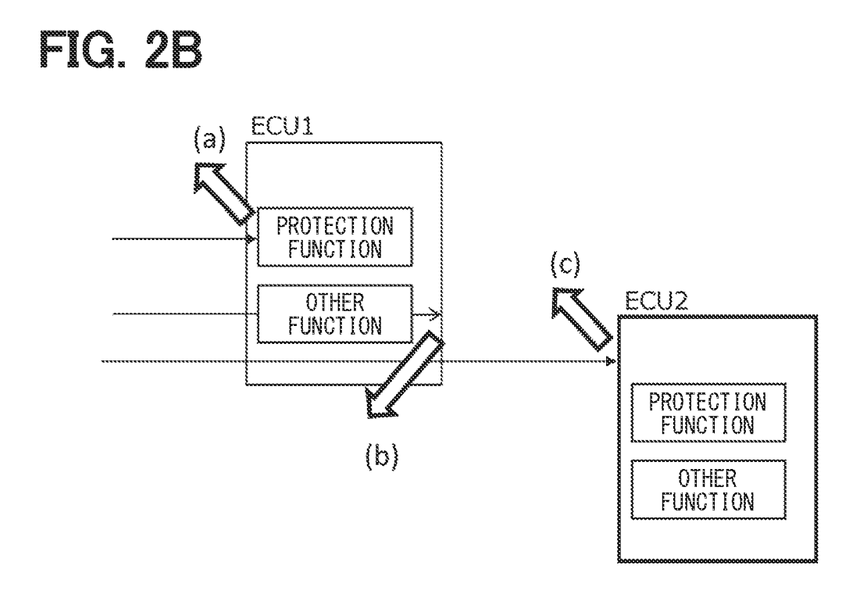

As illustrated in FIG. 2B, in the case of (a), a blocking method based on the protection function of the ECU 1 is set as provisional measures. Consequently, it is possible to stop intrusion of unauthorized information by using the protection function of the ECU 1.

In the case of (b), since the protection function of the ECU 1 is unable to perform normally, but the other function of the ECU 1 is operating normally, a blocking method of stopping an output operation from the ECU 1 based on the other function of the ECU 1 is set as provisional measures. Consequently, it is possible to stop unauthorized information from leaking out from the ECU 1 to the ECU 2.

In the case of (c), neither the protection function nor the other function of the ECU 1 is operating normally, but all of the functions of the ECU 2 are able to perform normally; therefore, a blocking method of stopping an input operation to the ECU 2 based on the other function of the ECU 2 is set as provisional measures. Alternatively, a blocking method based on the protection function of the ECU 2 may be set as provisional measures.

Function other than the protection function may be the functions of the ECU as a whole. Specifically, it may be determined whether or not the ECU is operating normally.

In the present embodiment, the blocking of unauthorized information may be set as provisional measures. In another embodiment, the blocking of unauthorized information may be executed as permanent measures. Therefore, the provisional measures of the present embodiment may be replaced with the "measures" which encompasses the provisional and/or permanent measures.

(3) Information Used for Determining Whether the Protection Function and the Function Other than Protection Function are Normal or Abnormal (a) The following information may be information (corresponding to "first information") "related" to the protection function of the ECU. This will be described together with an operation of the protection function and a reason why the operation of the function is inferable.

The term "related" includes not only directly indicating but also indirectly indicating. The operation of the function is indirectly indicated when the operation of the function is inferred from the first information or the second information. The same is applicable to the below-description.

Protection function process stop log: when a log indicative of stop of a protection function process is detected, it may be determined that the protection function is not operating normally.

Security setting change log: when details of a security setting change log indicate a default setting, it may be determined that the protection function is operating normally.

Secure boot log (for cases where the protection function is within an inspection scope): when the log indicates that the secure boot is successful, it may be determined that the protection function within the inspection scope is operating normally.

Log of operation at transmission of test packet for checking the protection function: the log of operation log is checked, and, when the log indicates the expected operation, it may be determined that the protection function is operating normally.

(b) Information (corresponding to "second information") "related" to the function of the ECU other than the protection function of the ECU includes the below-described information. This will be described together with the function other than the protection function and a reason why the operation is inferable.

Secure boot log (for cases where the function other than the protection function is within an inspection range): when the log indicates that the secure boot is successful, it may be determined that the function other than the protection function within the inspection range is operating normally.

Reprogramming execution log: when the log indicates that the last reprogramming results in the write of correct software, it may be determined that the function other than the protection function is operating normally.

Network abnormality detection log: when an ECU serving as a transmission source of abnormal communication is successfully specified, it may be determined that the function of the ECU other than the protection function of the ECU is not operating normally.

Host abnormality detection log: when an abnormality is detected with Control-Flow Integrity (CFI), it may be determined that the function of the ECU other than the protection function of the ECU is not operating normally.

Host abnormality detection log: when unauthorized execution of a process, a command, or a file is detected based on a whitelist, it may be determined that the function of the ECU other than the protection function of the ECU is not operating normally.

Failure information: when a failure other than a failure of the protection function is detected, it may be determined that the failure detected part of the ECU is not operating normally.

The determination may be performed using two or more items of the information listed above, which improves the determination accuracy.

2. Embodiment 1

In the present embodiment, an unauthorized intrusion prevention device is provided in the center device 200.

(1) Configuration of Vehicle-Mounted Device

Figure 3:
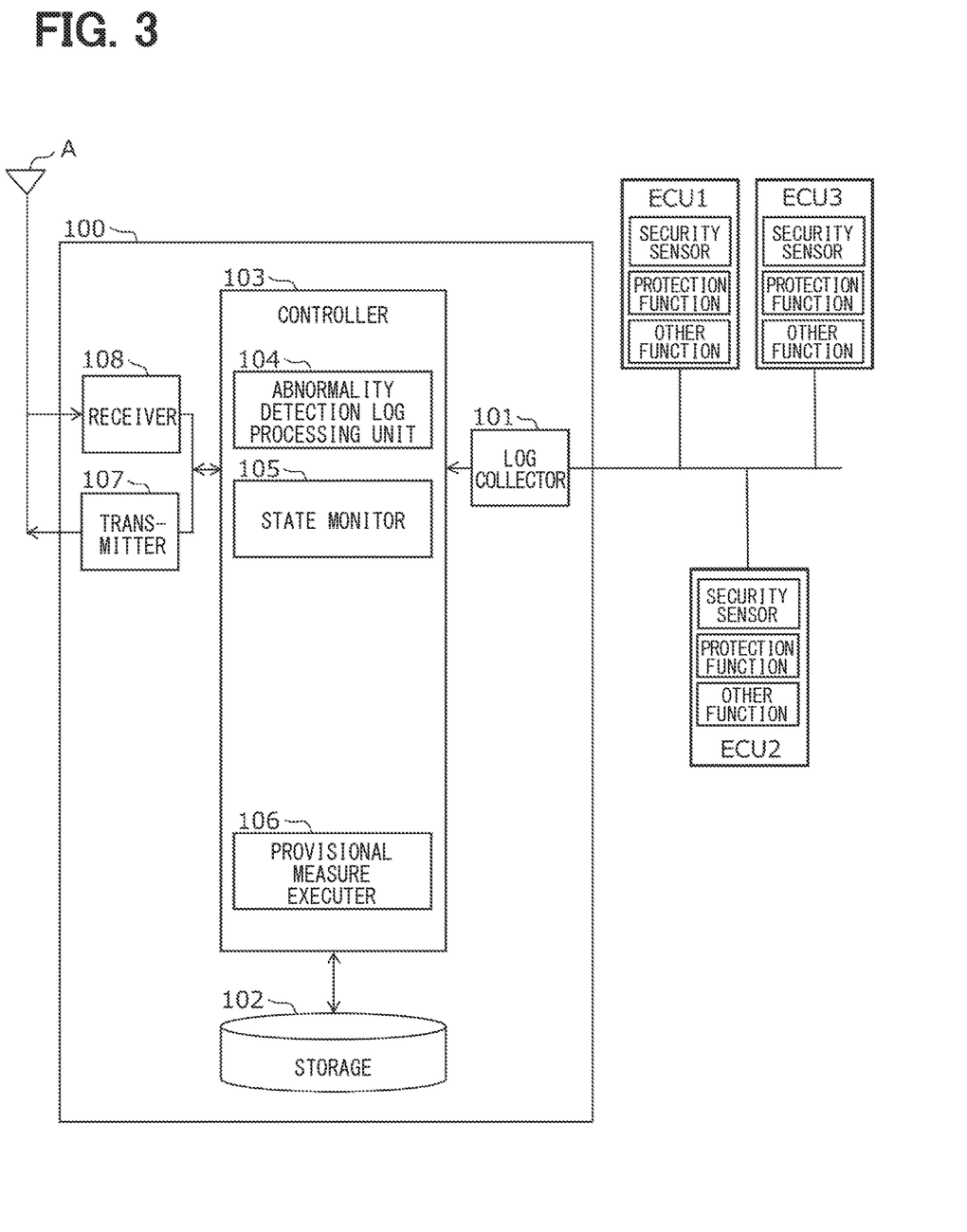
FIG. 3 is a block diagram illustrating a configuration example of vehicle-mounted device according to Embodiment 1 of the present disclosure.

A configuration of the vehicle-mounted device 100 of the present embodiment will be described with reference to FIG. 3.

The vehicle-mounted device 100 includes a log collector unit 101, a storage unit 102, a controller unit 103, a transmitter unit 107, and a receiver unit 108.

The vehicle-mounted device 100 may include a general-purpose central processing unit (CPU), a volatile memory such as a RAM, a non-volatile memory such as a ROM, a flash memory, a hard disk, etc., various interfaces, and an internal bus connecting these components to each other. The hardware executes software, thereby implementing a function of a respective functional block illustrated in FIG. 3. The same applies to the later described center device 200 illustrated in FIG. 4.

The vehicle-mounted device 100 may be implemented by dedicated hardware such as an LSI.

In the present embodiment, the vehicle-mounted device 100 is in the form of semifinished product, specifically, in the form of electronic controller unit (abbreviated as ECU).

However this is an example. In other embodiments, the vehicle-mounted device 100 may be in the form of component or the form of finished product. Examples of the form of component include a semiconductor circuit and a semiconductor module. Examples of the form of finished product include a personal computer (PC), a smartphone, a cellular phone, and a navigation system.

The vehicle-mounted device 100 may be provided as a single ECU or two or more ECUs. For example, a communication ECU perform communication with the outside may serve as the vehicle-mounted device 100.

Also, the two or more ECUs including the communication ECU may be provided as the vehicle-mounted device 100.

The log collector unit 101 is connected to one or two or more ECUs, wherein the one or more ECUs are "electronic control devices" connected to the vehicle-mounted device 100 via the in-vehicle network. The log collector unit 101 receives logs, examples of which include an abnormal log transmitted from a security sensor provided in a respective ECU, an operation status log (corresponding to the "first information") transmitted from the protection function provided in a respective ECU, and an operation status log (corresponding to the "second information") transmitted from the function of a respective ECU other than the protection function. The security sensor of a respective ECU monitors the respective ECU or ECU communication, and reports an abnormality via an abnormal log.

Herein, the term "electronic control device" may indicate any device as long as it processes information and exhibits a specific function. For example, the electronic control device may be a device called an information processing device, an information processing circuit, a controller unit, a control device, a calculation apparatus, or the like. A form of the electronic control device is not limited to a particular form. Various forms may be adopted including a form of component, a form of semifinished product and a form of finished product. Examples of the form of component include a semiconductor circuit and a semiconductor module. Examples of the form of semifinished product include an electronic control device and an electronic controller unit. The form of finished product include a server, a workstation, a personal computer (PC), a smartphone, a cellular phone, and a navigation system.

The ECU 1, the ECU 2, and the ECU 3 are not limited to particular ECUs. Examples of the ECU 1, 2, 3 include a drive system electronic control device controlling an engine, a steering wheel, a brake, and the like, a vehicle body system electronic control device controlling a meter, a power window, and the like, an information system electronic control device such as a navigation apparatus, and a safety control system electronic control device performing control for preventing collision with an obstacle or a pedestrian. The ECUs may be classified into a master and a slave or may have a parallel relationship.

Examples of the in-vehicle network include not only such a communication system as a Controller Area Network (CAN) and a Local Interconnect Network (LIN) but also other communication systems such as Ethernet (registered trademark), Wi-Fi (registered trademark) and Bluetooth (registered trademark).

The storage unit 102 stores the logs collected by the log collector unit 101. The storage unit 102 may acquire the log from the log collector unit 101 via the controller unit 103 or acquire the log directly from the log collector unit 101.

The storage unit 102 includes a non-volatile memory or a volatile memory.

The controller unit 103 controls operations of the log collector unit 101, the storage unit 102, the transmitter unit 107, and the receiver unit 108. The controller unit 103 by itself implements an abnormality detection log processing unit 104, a status monitor unit 105, and a provisional measures executer unit 106.

When the abnormality detection log processing unit 104 receives an abnormal log from the security sensor of the ECU, the abnormality detection log processing unit 104 instructs the transmitter unit 107 to transmit the abnormal log to the center device 200.

The status monitor unit 105 monitors a status of a respective ECU, and instructs the storage unit 102 to store an operation status log transmitted from the protection function provided in the ECU and an operation status logs transmitted from the function provided in the ECU other than the protection function. The status monitor unit 105 instructs the transmitter unit 107 to read the operation status log from the storage unit 102 and to transmit the operation status log to the center device 200 based on an instruction from the center device 200.

The provisional measures executer unit 106 executes provisional measures determined by the provisional measures determiner unit 213 of the center device 200. Specifically, the provisional measures executer unit 106 instructs a corresponding ECU to execute the provisional measures.

The transmitter unit 107 transmits an abnormal log and an operation status log to the center device 200 via the antenna A.

When the communication ECU performing external communication is provided separately from the vehicle-mounted device 100, the transmitter unit 107 transmits an abnormal log or an operation status log to the communication ECU. In this case, the transmitter unit 107 transmits the abnormal log or the operation status log to the center device 200 via the communication ECU.

The receiver unit 108 receives an operation status log request and a provisional measures execution instruction from the center device 200 via the antenna A. The operation status log request and the provisional measures execution instruction will be described later.

(2) Configuration of Center Device

Figure 4:
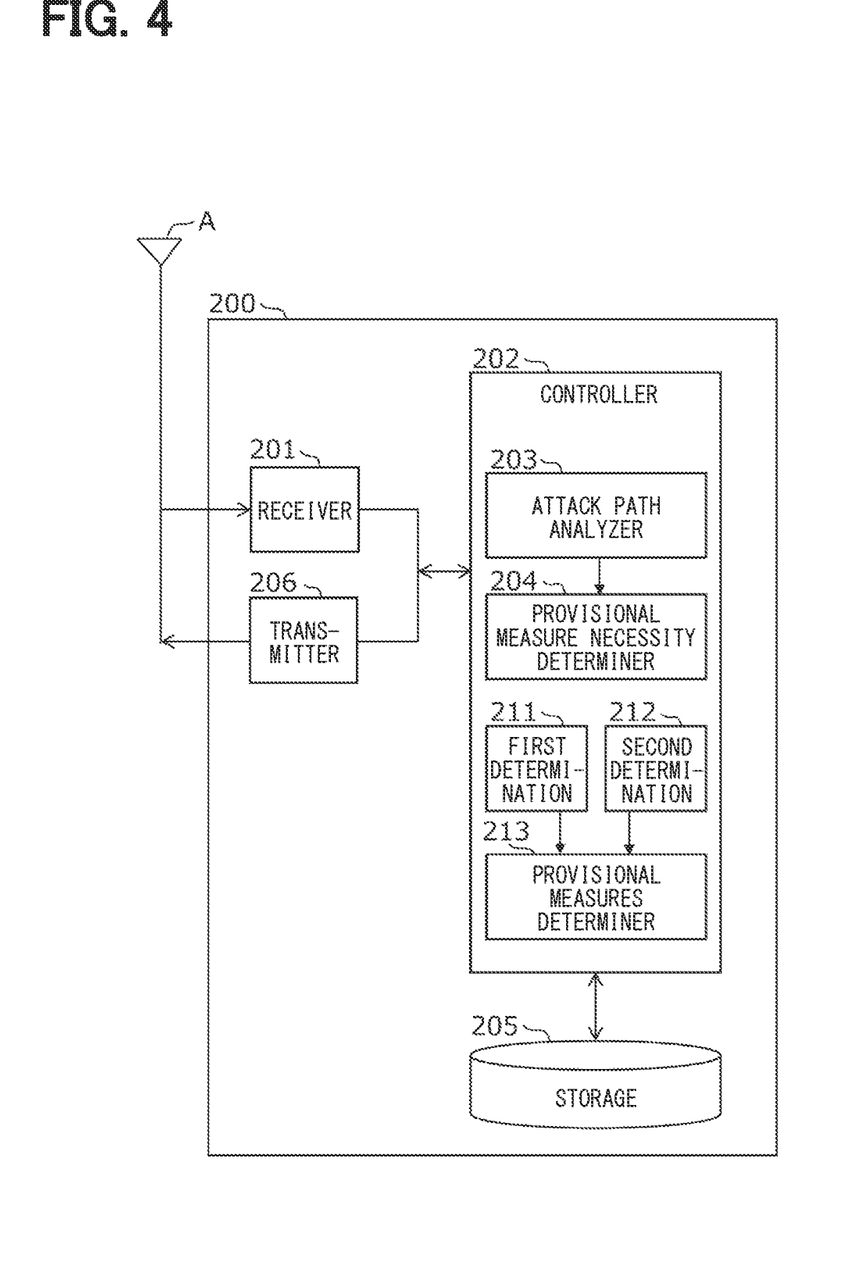
FIG. 4 is a block diagram illustrating a configuration example of a center device according to Embodiment 1 of the present disclosure.

A configuration of the center device 200 of the present embodiment will be described with reference to FIG. 4.

The center device 200 includes a receiver unit 201, a controller unit 202, a storage unit 205, and a transmitter unit 206.

In the present embodiment, the center device 200 is in the form of finished product, specifically in the form of server device as a finished product. However, the present disclosure is not limited to this. For example, the center device 200 may be in such the form of finished product as a workstation, a personal computer (PC), etc. Alternatively, the center device 200 may be in the form of semifinished product such as an ECU, or in the form of component such as a semiconductor circuit element.

The receiver unit 201 (corresponding to an "acquirer unit") receives the abnormal log and the operation status log transmitted from the vehicle-mounted device 100 via the antenna A.

The controller unit 202 controls the operations of the receiver unit 201, the storage unit 205, and the transmitter unit 206. The controller unit 202 by itself implements an attack path analyzer unit 203, a provisional measures necessity determiner unit 204, a first determiner unit 211, a second determiner unit 212, and a provisional measures determiner unit 213.

The attack path analyzer unit 203 analyzes the abnormal log received by the receiver unit 201, and estimates an attack path of an attack on the vehicle. The estimation of the attack path may refer to estimating via which ECU or which network an attack is made. Specifically, an attack path is estimated from information regarding a transmission source and a transmission destination of abnormal communication by using a network abnormality detection log. Alternatively, a host abnormality detection log is used to estimate an abnormality occurrence location on a host. The estimation result is output to the provisional measures necessity determiner unit 204.

The provisional measures necessity determiner unit 204 determines whether or not the provisional measures are necessary, based on the attack path estimated by the attack path analyzer unit 203. Specifically, based on the attack path and the abnormal log, the provisional measures necessity determiner unit 204 determines which ECU of the ECUs connected to the vehicle-mounted device 100 the intrusion of unauthorized information is reaching to. When it is determined that the provisional measures are necessary, the provisional measures necessity determiner unit 204 generates an operation status log request which is a transmission request for the operation status log of the ECU on the attack path, and instructs the transmitter unit 206 to transmit the operation status log request to the vehicle-mounted device 100.

The operation status log request may be transmitted not only to the vehicle that has transmitted the abnormal log but also to other vehicles. For example, the operation status log request may be transmitted to vehicles of the same vehicle model or type. Collection of the operation status logs from many vehicles makes it possible to expand an instruction-issue-target range, on an as-needed basis. The storage unit 205 of the center device 200 stores identification information including vehicle IDs (e.g., VINs) and the vehicle types and/or models, and stores abnormal logs and operation status logs of the vehicles in association with the vehicle IDs. For example, a result of the analysis may be that among vehicles of the same vehicle type or model, some vehicles have been attacked and the number of attacked vehicles is greater than or equal to a certain value. In this case, the provisional measures determiner unit 213 may instruct not only the attacked vehicles to execute the provisional measures but all of the vehicles of the same vehicle type or model to execute the provisional measures.

The first determiner unit 211 (corresponding to a "first determiner unit") determines whether the protection function is normal or abnormal, by using the operation status log (corresponding to "first information") "related" to the protection function of the ECU on the attack path among the operation status logs transmitted from the vehicle-mounted device 100 and received by the receiver unit 201 in response to the operation status log request. For a specific determination method, refer to the above 1.(3)(a).

The second determiner unit 212 (corresponding to a "second determiner unit") determines whether the function other than the protection function is normal or abnormal, by using, of the operation status logs transmitted from the vehicle-mounted device 100 in response to the operation status log request and received by the receiver unit 201, the operation status log (corresponding to "second information") "related" to the function of the ECU on the attack path other than the protection function of the ECU on the attack path. For a specific determination method, refer to the above 1.(3)(b).

In the present embodiment, the function of the ECU itself is used as the function other than the protection function. Specifically, it is determined "whether or not the ECU itself is operating normally".

"Whether the ECU (electronic control device) is normal or abnormal" refers to whether the correct operation of the electronic control device itself is guranteeable, and includes whether the electronic control device is alive or dead.

The provisional measures determiner unit 213 (corresponding to a "measures determiner unit") determines, as the provisional measures, an "unauthorized information" blocking method, by using the determination results of the first determiner unit 211 and the second determiner unit 212. For a specific method of determining the provisional measures in the present embodiment, refer to the logic described in the above 1.(2). The provisional measures determiner unit 213 generates a provisional measures execution instruction indicating the determined provisional measures, and instructs the transmitter unit 206 to transmit the provisional measures execution instruction to the vehicle-mounted device 100.

The provisional measures may be a single act or include a plurality of measures including a plurality of acts. For example, the measures to block unauthorized information while maintaining the safety of a vehicle include stopping the vehicle at a safe place first and thereafter blocking communications, rather than suddenly blocking the communication. In this case, in addition to the first information and the second information, other ECU operation statuses or security analysis results may be used.

The term "unauthorized information" encompasses a case where the virus itself is harmful and unauthorized, as well as cases where unauthorized access itself is not harmful information but the act of the unauthorized access is harmful and unauthorized.

The storage unit 205 stores the abnormal log and the operation status log received by the receiver unit 201. The storage unit 205 may store the operation status log request generated by the provisional measures necessity determiner unit 204 and/or the provisional measures execution instruction generated by the provisional measures determiner unit 213.

The transmitter unit 206 transmits the operation status log request and the provisional measures execution instruction to the vehicle-mounted device 100 via the antenna A.

In the present embodiment, the receiver unit 201 (corresponding to an "acquirer unit"), the first determiner unit 211 (corresponding to "first determiner unit"), the second determiner unit 212 (corresponding to "second determiner unit"), and the provisional measures determiner unit 213 (corresponding to "provisional measures determiner unit") are included in an unauthorized intrusion prevention device. Of course, the unauthorized intrusion prevention device may include another element. Further, the whole or part of the center device 200 provided outside the vehicle and communicating with the vehicle may be provided as the unauthorized intrusion prevention device.

Receipt, at the abnormality detection log processing unit 104, of the abnormal log is the beginning of the detection for the abnormality in the ECU. Alternatively, the beginning of the detection may be construable as estimation by the attack path analyzer unit 203 as to the attack path or determination by the provisional measures necessity determiner unit 204 as to the necessity of provisional measures. The same applies to Embodiment 2.

(3) Operation of Unauthorized Intrusion Prevention System

With reference to a flowchart of FIG. 5, explanation will be given on operations of the unauthorized intrusion prevention system 1 and on operations of the vehicle-mounted device 100 and the center device 200 (including the unauthorized intrusion prevention device) included in the unauthorized intrusion prevention system 1.

The below described operations are to be understood as not only disclosure of a method executed by the vehicle-mounted device 100 and the center device 200 included in the unauthorized intrusion prevention system 1, but also disclosure of processing procedures in a program executable by these devices.

Figure 5:
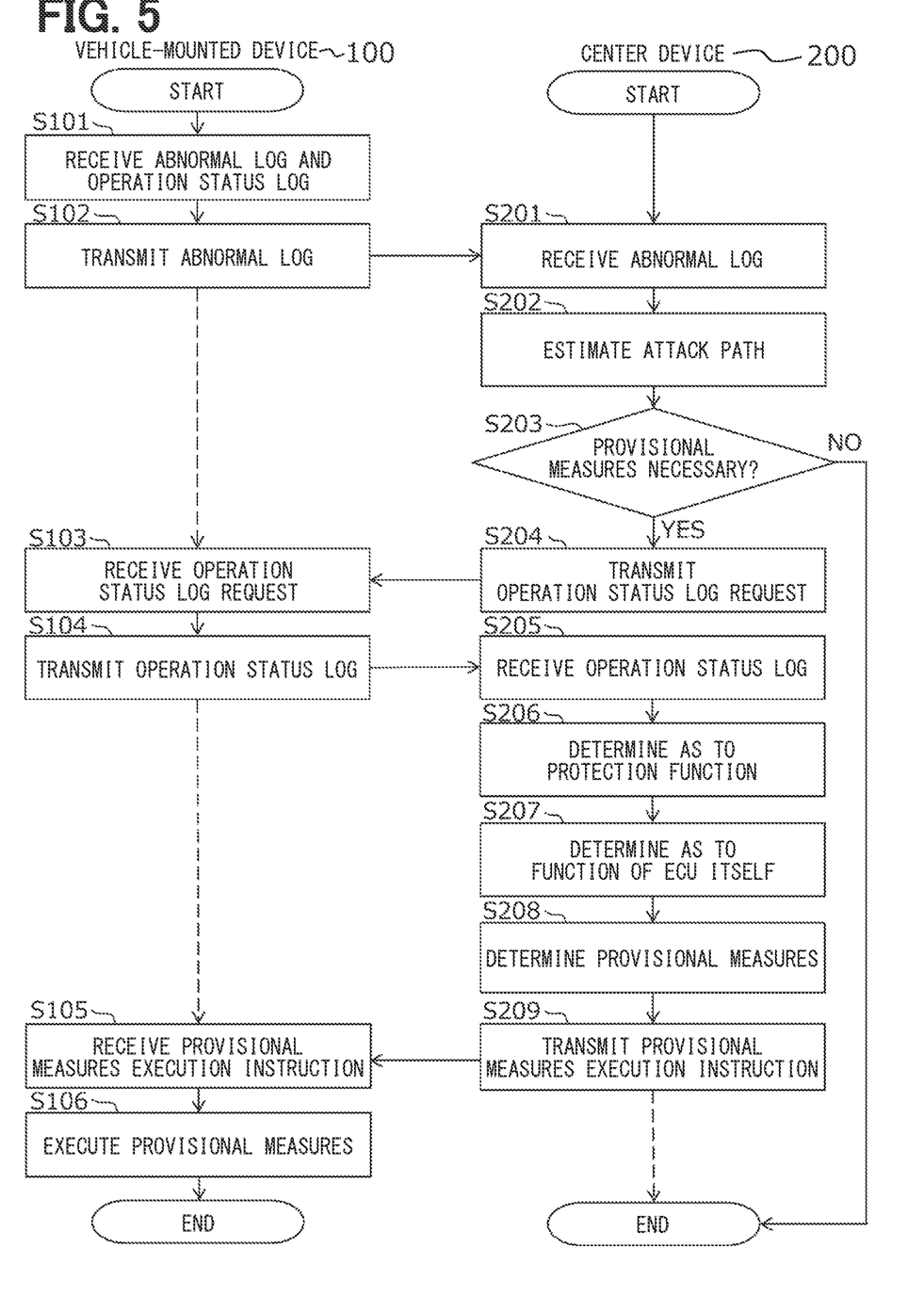
FIG. 5 is a flowchart illustrating an operation of the unauthorized intrusion prevention system according to Embodiment 1 of the present disclosure.

These processes are not limited to be executed in the order illustrated in FIG. 5. Specifically, the order may be changed as long as such changes are free from restrictions such as a relationship in which a certain step uses a result of the preceding step.

In S101, the log collector unit 101 of the vehicle-mounted device 100 receives an abnormal log transmitted from an ECU connected to the vehicle-mounted device 100, an operation status log (corresponding to "first information") transmitted from a protection function provided in a respective ECU, and an operation status log (corresponding to "second information") transmitted from the function provided in a respective ECU other than protection function.

In S102, the transmitter unit 107 transmits the abnormal log to the center device 200 (S102).

In S201, the receiver unit 201 of the center device 200 receives the abnormal log transmitted from the vehicle-mounted device 100.

In S202, the attack path analyzer unit 203 analyzes the abnormal log received by the receiver unit 201 to estimate an attack path of an attack on the vehicle.

In S203, the provisional measures necessity determiner unit 204 determines whether provisional measures are necessary, based on the attack path estimated by the attack path analyzer unit 203. When it is determined that the provisional measures are necessary, corresponding to YES at S203, the provisional measures necessity determiner unit 204 generates an operation status log request which is a transmission request for an operation status log of the ECU on the attack path, and instructs the transmitter unit 206 to transmit the operation status log request to the vehicle-mounted device 100. When it is determined that the provisional measures are not necessary, corresponding to NO at S203, the process is ended.

In S204, the transmitter unit 206 transmits the operation status log request to the vehicle-mounted device 100.

In S103, the receiver unit 108 of the vehicle-mounted device 100 receives the operation status log request from the center device 200.

The status monitor unit 105 reads the operation status log from the storage unit 102 based on the operation status log request, and instructs the transmitter unit 107 to transmit the operation status log to the center device 200. In S104, the transmitter unit 107 transmits the operation status log to the center device 200.

In S205, the receiver unit 201 of the center device 200 receives the operation status log transmitted from the vehicle-mounted device 100.

In S206, the first determiner unit 211 determines whether the protection function is normal or abnormal by using, of the operation status logs, the operation status log related to the protection function of the ECU on the attack path.

In S207, the second determiner unit 212 determines whether the function other than the protection function is normal or abnormal, by using, of the operation status logs, the operation status log related to the function of the ECU on the attack path other than the protection function of the ECU on the attack path. In the present embodiment, it is determined whether or not the ECU itself is operating normally (S207).

In S208, by using the determination results of the first determiner unit 211 and the second determiner unit 212, the provisional measures determiner unit 213 determines, as the a provisional measures against the attack, the unauthorized information blocking method. The provisional measures determiner unit 213 generates a provisional measures execution instruction indicating the determined provisional measures, and instructs the transmitter unit 206 to transmit the provisional measures execution instruction to the vehicle-mounted device 100.

In S209, the transmitter unit 206 transmits the provisional measures execution instruction to the vehicle-mounted device 100.

In S205, the receiver unit 108 of the vehicle-mounted device 100 receives the provisional measures execution instruction from the center device 200.

In S106, the provisional measures executer unit 106 executes the provisional measures based on the provisional measures execution instruction.

(4) Aspects

As described above, in some embodiments, the provisional measures are determined by using information regarding the protection function of the ECU and the function of the ECU other than the protection function, which makes it possible to take hierarchical provisional measures. As a result, it is possible to effectively block unauthorized information under minimum necessary constraints.

In some embodiments, the unauthorized intrusion prevention device is implemented by the center device 200, and therefore, the provisional measures can be determined by a device with a large amount of resources.

In some embodiments, the log transmitted in normal times is the abnormal log only, and the operation status log is transmitted upon determining that the provisional measures are necessary. Therefore, it is possible to reduce an amount of communication via the communication network 2. In some embodiments, the operation status log related to the attack path is transmitted instead of all of the operation status logs, and therefore, it is possible to reduce an amount of communication via the communication network 2.

3. Embodiment 2

In the present embodiment, the unauthorized intrusion prevention device is provided in the vehicle-mounted device 120.

(1) Configuration of Vehicle-Mounted Device

Figure 6:
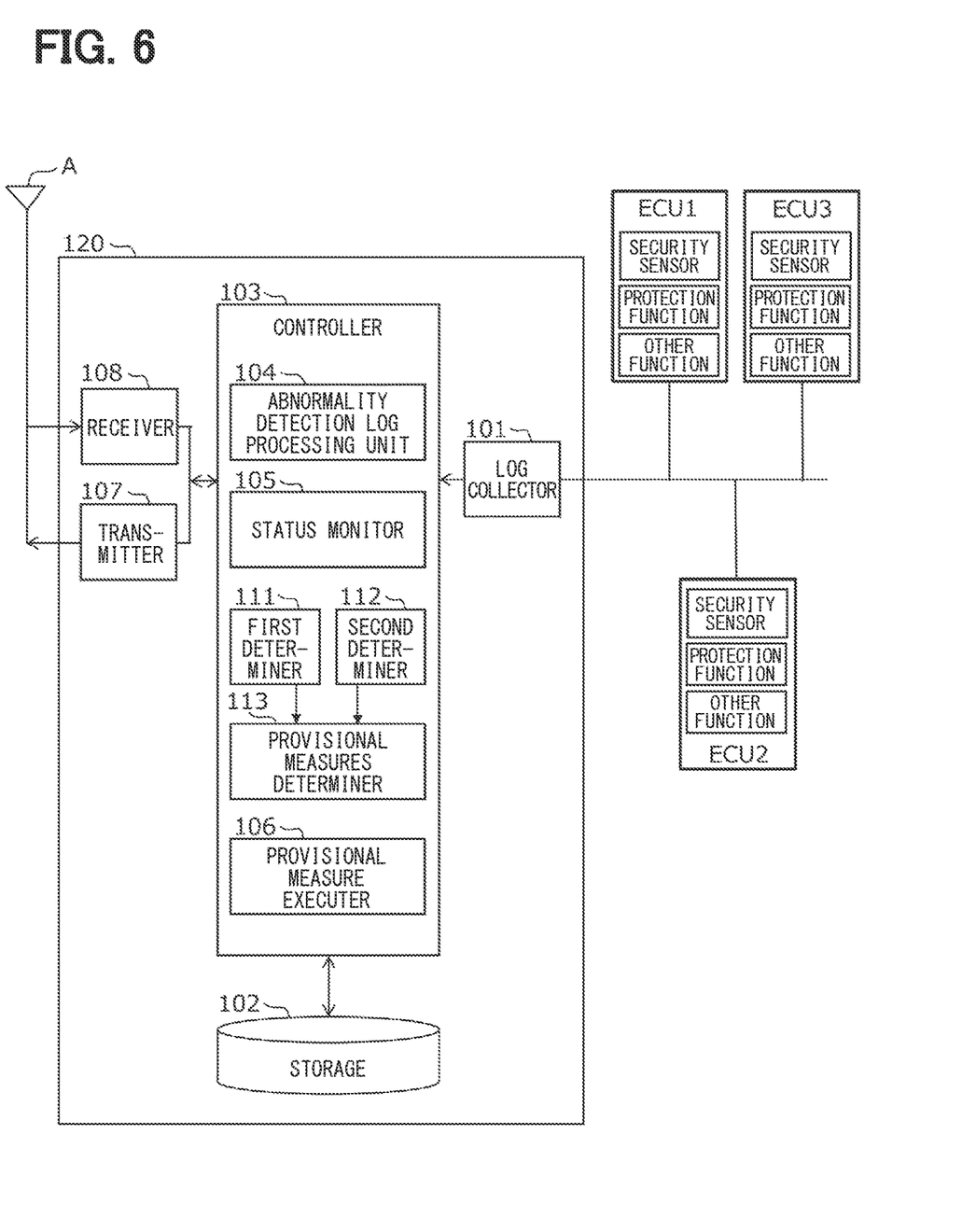
FIG. 6 is a block diagram illustrating a configuration example of vehicle-mounted device according to Embodiment 2 of the present disclosure.

A configuration of the vehicle-mounted device 120 of the present embodiment will be described with reference to FIG. 6.

The vehicle-mounted device 120 of the present embodiment is obtained by adding a first determiner unit 111, a second determiner unit 112, and a provisional measures determiner unit 113 to the vehicle-mounted device 100 of Embodiment 1. Since other configurations are the same as those in Embodiment 1, the description of Embodiment 1 are incorporated by reference. The first determiner unit 111, the second determiner unit 112, and the provisional measures determiner unit 113 have the same functions as those of the first determiner unit 211, the second determiner unit 212, and the provisional measures determiner unit 213 of the center device 200 of Embodiment 1.

The first determiner unit 111 corresponding to a "first determiner unit" determines whether the protection function is normal or abnormal, by using an operation status log (corresponding to "first information") "related" to the protection function of the ECU on the attack path among operation status logs received by the log collector unit 101 (corresponding to an "acquirer unit"). For a specific determination method, refer to the above 1.(3)(a). The log collector unit 101 corresponds to an "acquirer unit".

The second determiner unit 112 corresponding to a "second determiner unit" determines whether the function other than the protection function is normal or abnormal, by using an operation status log (corresponding to "second information") "related" to the function of the ECU on the attack path other than the protection function among the operation status logs received by the log collector unit 101. For a specific determination method, refer to the above 1.(3)(b). The log collector unit 101 corresponds to an "acquirer unit".

In the present embodiment, the function of the ECU itself is used as the function other than the protection function. Specifically, it is determined whether or not the ECU itself is operating normally.

The provisional measures determiner unit 113 corresponding to "measures determiner unit" determines, as the provisional measures, the unauthorized information blocking method, by using the determination results of the first determiner unit 111 and the second determiner unit 112. In the present embodiment, as a specific method of determining the provisional measures, the logic described in the above 1.(2) is used. The provisional measures determiner unit 113 generates the provisional measures execution instruction indicating the determined provisional measures. The provisional measures executer unit 106 executes the provisional measures based on the provisional measures execution instruction.

The provisional measures may be a single act or include a two or more measures of different acts. For example, the provisional measures to block unauthorized information while maintaining the safety of a vehicle includes first stopping the vehicle at a safe place and thereafter blocking the communication, rather than suddenly blocking the communication. In this case, in addition to the first information and the second information, other ECU operation statuses or security analysis results may be used.

In the present embodiment, the log collector unit 101 corresponding to "acquirer unit", the first determiner unit 111 corresponding to "first determiner unit", the second determiner unit 112 corresponding to "second determiner unit", and the provisional measures determiner unit 113 corresponding to "provisional measures determiner unit" are included in an unauthorized intrusion prevention device. Of course, the unauthorized intrusion prevention device may include another element. The whole or part of the vehicle-mounted device 120 "mounted in" a vehicle as an example of "movable object" may be provided as an unauthorized intrusion prevention device.

The "movable object" refers to an object that is movable, and its travel speed may be any speed, and therefore, the moving object may be in a stopped status. Examples of the movable object include, but not limited to, automobiles, motorcycles, bicycles, pedestrians, ships, aircrafts, and objects mounted thereto.

The term "mounted" includes not only directly fixed but also movable together with the movable object in a status of not being fixed to the movable object. For example, mounted in the movable object may be carried by a person onboard the movable body. Mounted in the movable object may be mounted in a load on the movable body.

(2) Configuration of Center Device

Figure 7:
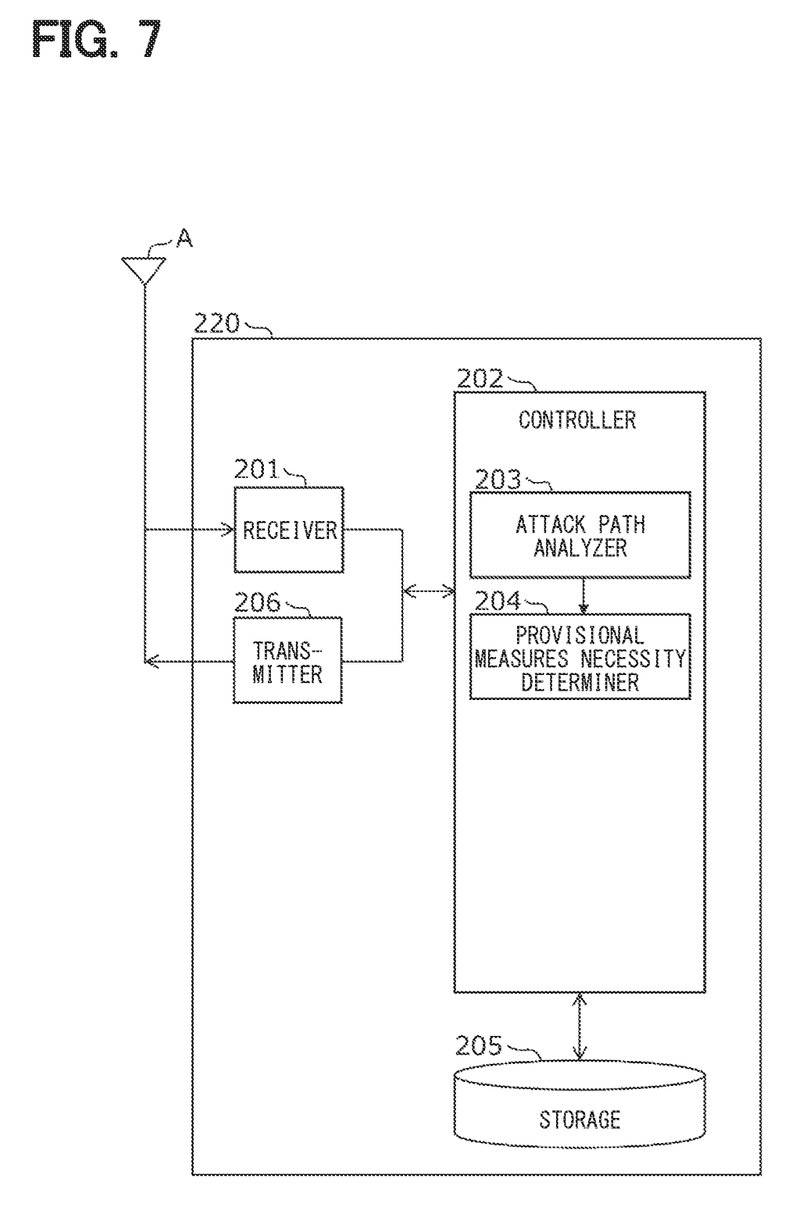
FIG. 7 is a block diagram illustrating a configuration example of a center device according to Embodiment 2 of the present disclosure.

The configuration of the center device 220 of the present embodiment will be described with reference to FIG. 7.

A difference between the center device 220 of the present embodiment and the center device of Embodiment 1 is that the first determiner unit 211, the second determiner unit 212, and the provisional measures determiner unit 213 are not included in the center device of the present embodiment. Other configurations are the same as those in Embodiment 1, and the description of Embodiment 1 for such configurations is incorporated by reference.

When the provisional measures necessity determiner unit 204 determines that the provisional measures are necessary, the provisional measures necessity determiner unit 204 generates the provisional measures determination instruction and instructs the transmitter unit 206 to transmit the provisional measures determination instruction to the vehicle-mounted device 100. The provisional measures determination instruction may include information on the attack path.

The provisional measures determination instruction may be transmitted to not only the vehicle that has transmitted the abnormal log but also to other vehicles. For example, on an as-needed basis, the operation status log request may be transmitted to vehicles of the same vehicle type or model so that it is possible to increase a provisional measures instruction issue range. The storage unit 205 of the center device 200 stores identification information such as vehicle IDs and the vehicle types or models, and stores abnormal logs and operation status logs of vehicles in association with the vehicle IDs. When the analysis of log reveals that, of the vehicles of the same type or model, some vehicles have been attacked and the number of attacked vehicles is greater than or equal to a certain value, the provisional measures determiner unit 213 may instruct all of the vehicles of the same type or model to execute the provisional measures rather than instructing only the attacked vehicles to execute the provisional measures.

(3) Operation of Unauthorized Intrusion Prevention System

Figure 8:
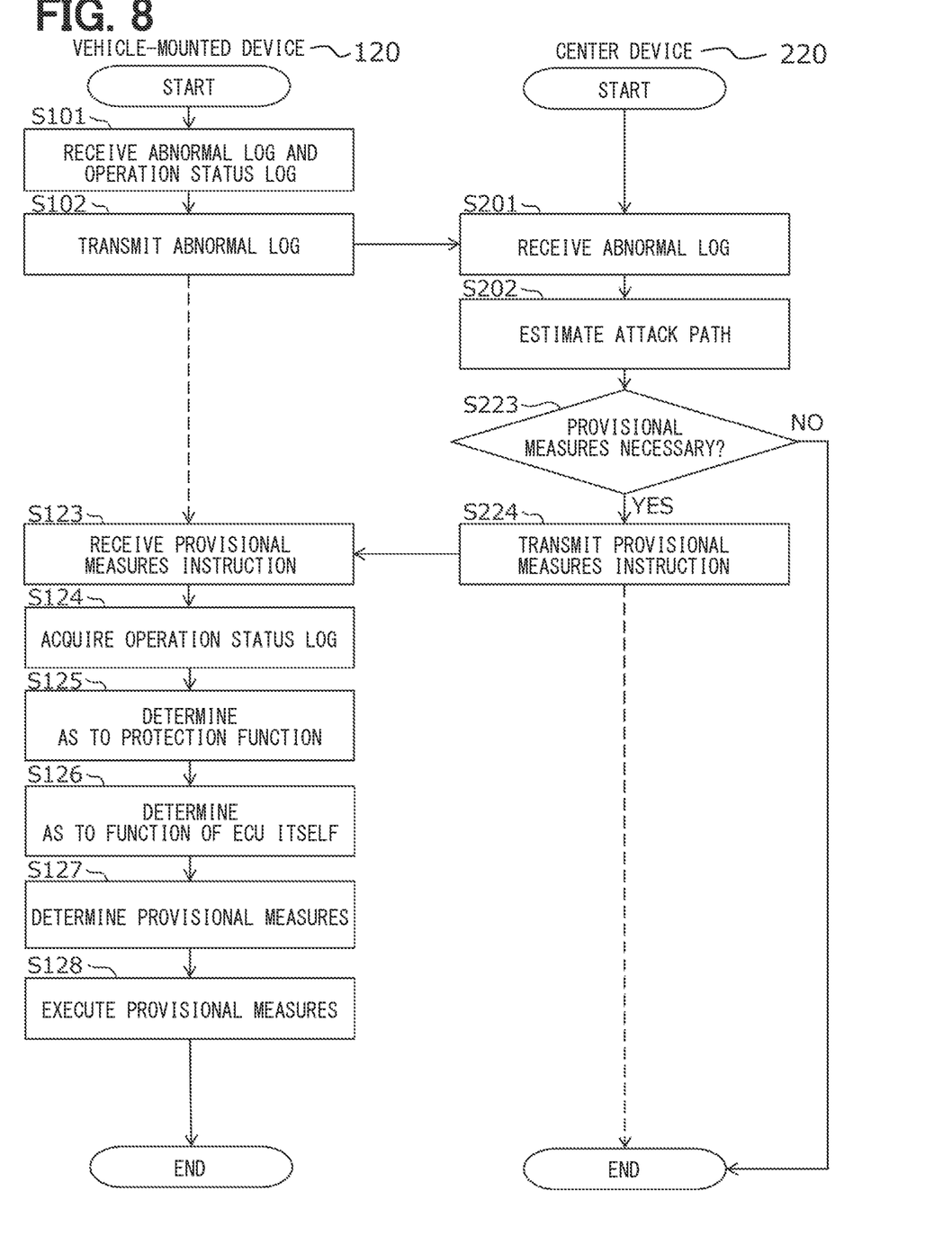
FIG. 8 is a flowchart illustrating an operation of the unauthorized intrusion prevention system according to Embodiment 2 of the present disclosure.

With reference to a flowchart of FIG. 8, explanation will be given on operations of the unauthorized intrusion prevention system 1 and operations of the vehicle-mounted device 120 (including the unauthorized intrusion prevention device) and the center device 220 included in the unauthorized intrusion prevention system 1. In FIG. 5 and FIG. 8, like reference signs are used to refer to like processes. For like processes, the description of FIG. 5 is incorporated by reference.

The below described operations are to be understood as not only disclosure of a method executed by the vehicle-mounted device 120 and the center device 220 included in the unauthorized intrusion prevention system 1, but also disclosure of processing procedures in a program executable by these devices.

These processes are not limited to being executed in the order illustrated in FIG. 8. The order may be changed as long as such changes are free from restrictions such as a relationship in which a certain step uses a result of the preceding step.

In S223, the provisional measures necessity determiner unit 204 determines whether the provisional measures are necessary, based on the attack path estimated by the attack path analyzer unit 203. When it is determined that the provisional measures are necessary, corresponding to YES at S223, the provisional measures necessity determiner unit 204 generates the provisional measures determination instruction and instructs the transmitter unit 206 to transmit the provisional measures determination instruction to the vehicle-mounted device 120. When it is determined that the provisional measures are not necessary, corresponding to NO at S223, the process is ended.

In step S224, the transmitter unit 206 transmits the provisional measures determination instruction to the vehicle-mounted device 120.

In S123, the receiver unit 108 of the vehicle-mounted device 120 receives the provisional measures determination instruction from the center device 200.

In S124, the status monitor unit 105 reads operation status logs of the ECU on the attack path from the storage unit 102.

In S125, the first determiner unit 111 determines whether the protection function is normal or abnormal, by using, of the operation status logs, the operation status log related to the protection function of the ECU on the attack path.

In S126, the second determiner unit 112 determines whether the function other than the protection function is normal or abnormal, by using, of the operation stat logs, the operation status log related to the function of the ECU on the attack path other than the protection function. In the present embodiment, it is determined whether or not the ECU itself is operating normally.

In S127, the provisional measures determiner unit 113 determines, as the provisional measures, the unauthorized information blocking method, by using the determination results of the first determiner unit 111 and the second determiner unit 112. The provisional measures determiner unit 213 generates the provisional measures execution instruction indicating the determined provisional measures.

In S128, the provisional measures executer unit 106 executes the provisional measures based on the provisional measures execution instruction.

(4) Aspects

As described above, according to the present embodiment, the provisional measures are determined by using information regarding the protection function of the ECU and the function of the ECU other than the protection function, and therefore, the hierarchical provisional measures can be taken. As a result, it is possible to effectively block the unauthorized information under minimum necessary constraints.

In some embodiments, the unauthorized intrusion prevention device is implemented by the vehicle-mounted device 120, and therefore, it is possible to acquire the operation status log without using the communication network 2 and perform processes in the vehicle.

In some embodiments, the log transmitted in normal times is only the abnormal log, and therefore, it is possible to reduce an amount of communication via the communication network.

4. Other Embodiments

The center device 200 of Embodiment 1 and the vehicle-mounted device 120 of Embodiment 2 may be used in combination. In this case, since the unauthorized intrusion prevention device is present in both the center device 200 and the vehicle-mounted device 120, the unauthorized intrusion prevention device to be used may be switched according to, for example, communication quality of the communication network 2. Specifically, when the communication quality is equal to or lower than a predetermined quality, the unauthorized intrusion prevention device of the vehicle-mounted device 120 is used. When the communication quality is equal to or higher than the predetermined quality, the unauthorized intrusion prevention device of the center device 200 is used. As a result, even when communication between the vehicle-mounted device 120 and the center device 200 is difficult, the provisional measures can be completed by the vehicle-mounted device 120.

The unauthorized intrusion prevention system, the vehicle-mounted device, and the center device in some embodiments have been described above.

The terms used in the embodiments are examples, and the terms may be replaced with terms that are synonymous or encompass synonymous functions.

The block diagram used in the description of the embodiments represents classification and arrangement of the configurations of the devices on a function basis. The blocks representing the respective functions are implementable by various combinations of hardware and various combinations of hardware and software. Since the blocks represent the functions, such a block diagram is also to be understood as disclosures of a method and a program for implementing the method.

A change in order of functional blocks understandable as processes, flows, and methods described in the respective embodiments may be changed as long as the change is free from a relationship in which a certain step uses a result of the preceding step.

The terms such as first, second, to N-th (where N is an integer) used in embodiments and in the claims are used to distinguish two or more configurations and methods of the same kind and are not intended to limit the order or superiority.

Some of the described embodiments assume the device for vehicles. Alternatively, the devices may be devices for dedicated use other than for vehicles. The devices may be devices for genera-purpose use.

Some of the above embodiments assume the vehicle-mounted device mounted in the vehicle is described. Alternatively, the device may be a device carried by a pedestrian.

Examples of forms of the vehicle-mounted device and the center device of the present disclosure include the form of component, the form of semifinished product and the form of finished product.

Examples of the form of component include a semiconductor device, an electronic circuit, a module, and a microcomputer.

Examples of the form of semifinished product include an electronic control device (electronic controller unit (ECU)) and a system board.

Examples of the form of finished product include a cellular phone, a smartphone, a tablet computer, a personal computer (PC), a workstation, and a server.

Examples of the form of the device include a device having a communication function and the like, and include, for example, a video camera, a still camera, and a car navigation system.

Devices or functions such as an antenna and a communication interface may be added to the vehicle-mounted device or the center device.

The center device of the present disclosure may provide various services. Along with providing such services, the center device of the present disclosure may operate in the ways described in the above embodiments. The same is applicable to the method of the present disclosure and the program of the present disclosure.

The embodiments of the present disclosure are implementable by dedicated hardware having the configurations and functions described in the respective embodiments. Also, the embodiments may be implementable by a combination of a program stored on a storage medium such as a memory or a hard disk, and general-purpose hardware including a dedicated or general-purpose CPU that can execute the program, a memory, and the like.

A program stored in a non-transitory tangible storage medium (for example, an external storage device (a hard disk, a USB memory, a CD/BD, or the like) of dedicated or general-purpose hardware, or an internal storage device (a RAM, a ROM, or the like)) may also be provided to dedicated or general-purpose hardware via a non-transitory storage medium or from a server via a communication line without via non-transitory storage medium. This makes it possible to provide the latest functions via program upgrade.

In some embodiments, the vehicle-mounted device is an electronic control device for vehicles, in particular, automobiles. T the vehicle-mounted device of the present disclosure may be applied not only to a motorcycle, a bicycle with an electric motor, and a railroad but also to movable objects in general such as a pedestrian, a ship, and an aircraft.

The technical concept embodied as the vehicle-mounted device may be applied to a device for various applications such as a cellular phone, a tablet computer, and a game machine.

The units and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

What is claimed is:

1. An unauthorized intrusion prevention device that, in response to detection of abnormality in an electronic control device mounted in a movable body and having a protection function against unauthorized intrusion and a function other than the protection function, gives an instruction for executing measures for the movable body, the unauthorized intrusion prevention device comprising:

an acquirer unit that acquires a log indicating first information related to the protection function of the electronic control device and a log indicating second information related to the function of the electronic control device other than the protection function;

a first determiner unit that, using the first information, performs a determination of whether the protection function is normal or abnormal;

a second determiner unit that, using the second information, performs a determination of whether the function other than the protection function is normal or abnormal; and a measures determiner unit that, using a result of the determination by the first determiner unit and a result of the determination by the second determiner unit, determines, as the measures, a blocking method of blocking unauthorized information in the movable object, wherein when the first determiner unit determines that the protection function is normal, the measures determiner unit sets the measures to the blocking method that is based on the protection function;

when the first determiner unit determines that the protection function is abnormal and the second determiner unit determines that the function other than the protection function is normal, the measures determiner unit sets the measures to the blocking method that includes stopping an output operation from the electronic control device; and when the first determiner unit determines that the protection function is abnormal and the second determiner unit determines that the function other than the protection function is abnormal, the measures determiner unit sets the measures to the blocking method that includes stopping an input operation to another electronic control device located in a lower layer than the electronic control device or the blocking method that is based on a protection function of the another electronic control device.

2. The unauthorized intrusion prevention device according to claim 1, wherein
the function other than the protection function is the electronic control device itself.

3. The unauthorized intrusion prevention device according to claim 1, wherein
the unauthorized intrusion prevention device is a center device that is provided outside the movable object and performs communication with the movable object.

4. The unauthorized intrusion prevention device according to claim 1, wherein
the unauthorized intrusion prevention device is mounted in the movable object.

5. The unauthorized intrusion prevention device according to claim 1, wherein
the second determiner unit determines whether the electronic control device is alive or dead, thereby performing the determination of whether the function other than the protection function is normal or abnormal.

6. An unauthorized intrusion prevention method of, in response to detection of abnormality in an electronic control device mounted in a movable body and having a protection function against unauthorized intrusion and a function other than the protection function, giving an instruction for executing measures for the movable body,
the unauthorized intrusion prevention method comprising:

acquiring a log indicating first information related to the protection function of the electronic control device and a log indicating second information related to the function of the electronic control device other than the protection function;

performing a first determination of whether the protection function is normal or abnormal, by using the first information;

performing a second determination of whether the function other than the protection function is normal or abnormal, by using the second information; and by using a result of the first determination and a result of the second determination, determining, as the measures, a blocking method of blocking unauthorized information in the movable object, wherein the determining the blocking method includes:

setting the measures to the blocking method that is based on the protection function in response to determining that the protection function is normal in the first determination;

setting the measures to the blocking method that includes stopping an output operation from the electronic control device in response to determining that the protection function is abnormal in the first determination and determining that the function other than the protection function is normal in the second determination; and setting the measures to the blocking method that includes stopping an input operation to another electronic control device located in a lower layer than the electronic control device or the blocking method that is based on a protection function of the another electronic control device in response to determining that the protection function is abnormal in the first determination and determining that the function other than the protection function is abnormal in the second determination.

7. A non-transitory storage medium storing an unauthorized intrusion prevention program executable by an unauthorized intrusion prevention device that, in response to detection of an abnormality in an electronic control device mounted in a movable object and having a protection function against unauthorized intrusion and a function other than the protection function, gives an instruction for executing measures for the movable object, the unauthorized intrusion prevention program, when executed by the unauthorized intrusion prevention device, causing the unauthorized intrusion prevention device to perform:

acquiring a log indicating first information related to the protection function of the electronic control device and a log indicating second information related to the function of the electronic control device other than the protection function;

performing a first determination of whether the protection function is normal or abnormal, by using the first information;

performing a second determination of whether the function other than the protection function is normal or abnormal, by using the second information; and by using a result of the first determination and a result of the second determination, determining as the measures a blocking method of blocking unauthorized information in the movable object, wherein the determining the blocking method includes:

setting the measures to the blocking method that is based on the protection function in response to determining that the protection function is normal in the first determination;

setting the measures to the blocking method that includes stopping an output operation from the electronic control device in response to determining that the protection function is abnormal in the first determination and determining that the function other than the protection function is normal in the second determination; and setting the measures to the blocking method that includes stopping an input operation to another electronic control device located in a lower layer than the electronic control device or the blocking method that is based on a protection function of the another electronic control device in response to determining that the protection function is abnormal in the first determination and determining that the function other than the protection function is abnormal in the second determination.

* * * * *